(12) United States Patent
Cernohous

(10) Patent No.: US 10,792,846 B2
(45) Date of Patent: Oct. 6, 2020

(54) METHOD FOR PRODUCING COMPOSITE SUBSTRATES

(71) Applicant: Magma Flooring LLC, River Falls, WI (US)

(72) Inventor: Jeffrey Jacob Cernohous, Hudson, WI (US)

(73) Assignee: Magma Flooring LLC, River Falls, WI (US)

( * ) Notice: Subject to any disclaimer, the term of this patent is extended or adjusted under 35 U.S.C. 154(b) by 100 days.

(21) Appl. No.: 15/766,776

(22) PCT Filed: Oct. 7, 2016

(86) PCT No.: PCT/US2016/056067
§ 371 (c)(1),
(2) Date: Apr. 6, 2018

(87) PCT Pub. No.: WO2017/062815
PCT Pub. Date: Apr. 13, 2017

(65) Prior Publication Data
US 2018/0297245 A1   Oct. 18, 2018

Related U.S. Application Data

(60) Provisional application No. 62/238,221, filed on Oct. 7, 2015.

(51) Int. Cl.
*B29C 39/16* (2006.01)
*B29B 13/06* (2006.01)
(Continued)

(52) U.S. Cl.
CPC .............. *B29C 39/16* (2013.01); *B29B 13/06* (2013.01); *B29C 70/025* (2013.01); *C08K 3/40* (2013.01);
(Continued)

(58) Field of Classification Search
USPC .......... 524/35, 914, 923; 156/62.2; 523/219
See application file for complete search history.

(56) References Cited

U.S. PATENT DOCUMENTS 2,371,868 A    3/1945  Berg et al.
3,668,179 A    6/1972  Di Biasi et al.
(Continued)

FOREIGN PATENT DOCUMENTS

CN    102432959    5/2012
EP    0651003      5/1995
(Continued)

OTHER PUBLICATIONS

"ASTM E831-14: Standard Test Method for Linear Thermal Expansion of Solid Materials by Thermomechanical Analysis," Aug. 1, 2014 (5 pgs).

(Continued)

*Primary Examiner* — Fred M Teskin
(74) *Attorney, Agent, or Firm* — Patterson Thuente Patterson, P.A.

(57) ABSTRACT

A method of forming a substrate in a thermal compression bonding process that permit substantially greater amounts of fillers than previously accomplished. The method employs a dispersion of a thermoplastic binder and a filler. The dispersion is then thermally compression bonded to form a substrate. Lightweight fillers are one example of fillers that are ideally suited for the thermal compression bonding through the use of a dispersion. Such lightweight fillers enable the formation of a substrate with a very low and desirable specific gravity.

10 Claims, 1 Drawing Sheet

(51) Int. Cl.
  B29C 70/02    (2006.01)
  C08K 3/40     (2006.01)
  C08K 7/02     (2006.01)
  C08K 7/22     (2006.01)
  B29K 101/12   (2006.01)
  B29K 105/16   (2006.01)
  B29L 31/10    (2006.01)
  B29L 31/30    (2006.01)

(52) U.S. Cl.
  CPC ...... B29K 2101/12 (2013.01); B29K 2105/16
        (2013.01); B29L 2031/10 (2013.01); B29L
        2031/30 (2013.01); B32B 2419/00 (2013.01);
                         B32B 2605/00 (2013.01)

(56) References Cited

U.S. PATENT DOCUMENTS

| | | | |
|---|---|---|---|
| 3,684,645 A * | 8/1972 | Temple | B29C 70/081 428/220 |
| 3,717,499 A | 2/1973 | McClure | |
| 4,164,526 A | 8/1979 | Clay et al. | |
| 4,248,931 A | 2/1981 | Salman | |
| 4,547,421 A | 10/1985 | Dunbar | |
| 4,582,756 A | 4/1986 | Niinuma et al. | |
| 4,616,042 A | 10/1986 | Avakian | |
| 4,767,580 A | 8/1988 | Shingo et al. | |
| 4,793,956 A | 12/1988 | Nogiwa et al. | |
| 4,878,970 A | 11/1989 | Schubert et al. | |
| 5,118,532 A | 6/1992 | Batson et al. | |
| 5,219,163 A | 6/1993 | Watson | |
| 5,238,622 A | 8/1993 | Grimmer | |
| 5,351,895 A | 10/1994 | Brooks et al. | |
| 5,364,412 A | 11/1994 | Furukawa | |
| 5,827,460 A | 10/1998 | Brentrup et al. | |
| 5,965,232 A | 10/1999 | Vinod | |
| 5,973,049 A | 10/1999 | Bieser et al. | |
| 6,017,991 A | 1/2000 | Drummond et al. | |
| 6,068,715 A * | 5/2000 | Yokokita | B24D 11/00 156/62.2 |
| 6,153,674 A | 11/2000 | Landin | |
| 6,231,650 B1 | 5/2001 | Mallow et al. | |
| 6,271,270 B1 | 8/2001 | Muzzy | |
| 6,316,075 B1 | 11/2001 | Desai et al. | |
| 6,387,967 B2 | 5/2002 | Muzzy | |
| 6,572,697 B2 | 6/2003 | Gleeson et al. | |
| 6,620,487 B1 | 9/2003 | Tonyan et al. | |
| 6,743,742 B1 | 6/2004 | LaRocco et al. | |
| 6,861,128 B1 | 3/2005 | Muller et al. | |
| 6,872,246 B2 | 3/2005 | Merkley et al. | |
| 6,907,708 B2 | 6/2005 | Naji et al. | |
| 7,081,300 B2 | 7/2006 | Laurence et al. | |
| 7,241,818 B2 | 7/2007 | Hemmings et al. | |
| 7,361,401 B2 | 4/2008 | Desai et al. | |
| 7,455,793 B2 | 11/2008 | Hsu et al. | |
| 7,455,798 B2 | 11/2008 | Datta et al. | |
| 7,470,488 B2 | 12/2008 | Lee et al. | |
| 7,763,345 B2 | 7/2010 | Chen et al. | |
| 8,106,105 B2 | 1/2012 | Cernohous | |
| 8,431,054 B2 | 4/2013 | Pervan et al. | |
| 10,414,911 B2 | 9/2019 | Cernohous et al. | |
| 10,479,057 B2 | 11/2019 | Bennett et al. | |
| 10,501,945 B2 | 12/2019 | Cernohous et al. | |
| 2001/0028127 A1 | 10/2001 | Hinds et al. | |
| 2002/0025414 A1 | 2/2002 | Desai et al. | |
| 2002/0031653 A1 | 3/2002 | Ricciardelli et al. | |
| 2005/0020747 A1 | 1/2005 | Symons | |
| 2005/0124763 A1 | 6/2005 | Mikami et al. | |
| 2005/0166513 A1 | 8/2005 | Vanderhoef | |
| 2006/0019078 A1 | 1/2006 | Osten et al. | |
| 2006/0142455 A1 | 6/2006 | Agarwal et al. | |
| 2007/0020747 A1 | 1/2007 | Lu | |
| 2007/0027234 A1 | 3/2007 | Ma et al. | |
| 2007/0072961 A1 | 3/2007 | Ma et al. | |
| 2007/0155859 A1 | 7/2007 | Song et al. | |
| 2008/0001429 A1 | 1/2008 | Willis | |
| 2008/0187739 A1 | 8/2008 | Baker et al. | |
| 2008/0207831 A1 | 8/2008 | Feinberg | |
| 2008/0287576 A1 | 11/2008 | Nichols et al. | |
| 2009/0020914 A1 | 1/2009 | Nelson et al. | |
| 2010/0010141 A1 | 1/2010 | Nakamura et al. | |
| 2010/0016459 A1 | 1/2010 | Cernohous | |
| 2010/0030003 A1 | 2/2010 | Basset et al. | |
| 2011/0177308 A1 | 7/2011 | Anderson et al. | |
| 2011/0272860 A1 | 11/2011 | Walia et al. | |
| 2012/0059074 A1 | 3/2012 | Adkinson et al. | |
| 2012/0070646 A1 | 3/2012 | Ha et al. | |
| 2012/0088072 A1 | 4/2012 | Pawloski et al. | |
| 2012/0135203 A1 | 5/2012 | Albert et al. | |
| 2012/0208933 A1 | 8/2012 | Hamilton et al. | |
| 2012/0237606 A1 | 9/2012 | Wellings | |
| 2013/0147090 A1 | 6/2013 | Schromm et al. | |
| 2013/0189511 A1 | 7/2013 | Cernohous et al. | |
| 2014/0005307 A1 | 1/2014 | Cernohaus et al. | |
| 2015/0065974 A1 | 3/2015 | Michiels et al. | |
| 2015/0152650 A1 | 6/2015 | Cernohous et al. | |
| 2015/0315377 A1 | 11/2015 | Mehta et al. | |
| 2016/0083619 A1 | 3/2016 | Anderson et al. | |
| 2016/0369516 A1 | 12/2016 | Cappelle | |
| 2018/0178420 A1 | 6/2018 | Bennett et al. | |
| 2018/0297245 A1* | 10/2018 | Cernohous | B29C 39/16 |
| 2019/0330455 A1 | 10/2019 | Cernohous et al. | |

FOREIGN PATENT DOCUMENTS

| | | |
|---|---|---|
| EP | 0794214 | 9/1997 |
| EP | 2754688 | 7/2014 |
| JP | 51098798 | 8/1976 |
| JP | 04236246 | 8/1992 |
| JP | 2002-322810 | 8/2002 |
| JP | 2004-292653 | 10/2004 |
| JP | 2005-082802 | 3/2005 |
| JP | 2013234255 | 11/2013 |
| JP | 2007031706 | 2/2017 |
| KR | 1020020071203 | 9/2002 |
| KR | 1020020071204 | 3/2004 |
| SU | 1775425 | 11/1992 |
| WO | WO9935182 | 7/1999 |
| WO | WO 0198064 | 12/2001 |
| WO | WO2002015299 | 2/2002 |
| WO | WO2006123993 | 11/2006 |
| WO | WO 2007102825 | 9/2007 |
| WO | WO 2008094529 | 8/2008 |
| WO | WO 2009134403 | 11/2009 |
| WO | WO 2012001091 | 1/2012 |
| WO | WO 2012016916 | 2/2012 |
| WO | WO 2013179260 | 12/2013 |
| WO | WO 2013181379 | 12/2013 |
| WO | WO 2014207308 | 12/2014 |
| WO | WO 2016115556 | 7/2016 |

OTHER PUBLICATIONS

"Polyvinyl Chloride (PVC) Typical Properties Generic PVC, Rigid | UL Prospector," Jan. 6, 2015, XP055502548, Retrieved from the Internet: URL: https://web.archive.org/web/20150106145449/http://plastics.ulprospector.com:80/generics/46/c/t/polyvinyl-chloride-pvc-properties-processing/sp/8 [retrieved on Aug. 28, 2018].

"Composite Solutions, Reinforcement Guide: Transforming the World with Advanced Solutions," Mar. 1, 2011, XP 055508480, Toledo, Ohio, 43659; Retrieved from the Internet: <URL:http://www.ocvreinforcements.com/pdf/library/Composite_Solutions_Guide_100360_Efinalprintable.pdf> [retrieved on Sep. 20, 2018] (128 pgs).

Application and File History for U.S. Appl. No. 12/523,819, filed Jul. 20, 2009, inventor Cernohous.

Application and File History for U.S. Appl. No. 14/404,544, filed Nov. 28, 2014, inventors Cernohous et al.

Application and File History for U.S. Appl. No. 14/555,930, filed Nov. 28, 2014, inventors Cernohous et al.

Application and File History for U.S. Appl. No. 15/552,092, filed Aug. 18, 2017, inventor Bennett et al.

(56) References Cited

OTHER PUBLICATIONS

Application and File History for U.S. Appl. No. 15/571,454, filed Nov. 2, 2017, inventors Cernohous et al.
Application and File History for U.S. Appl. No. 15/575,758, filed Nov. 20, 2017, inventors Bennett et al.
Application and File History for U.S. Appl. No. 16/460,287, filed Jul. 2, 2019, inventors Cernohous et al.
Chinese Office Action for Application No. 201380027887.7, dated Jan. 29, 2016. Translation provided.
Chinese Office Action for Application No. 201680041873.4 dated Jan. 11, 2019. English translation provided.
EP Communication for Application No. 13 796 809.5 pursuant to Article 94(3) EPC, dated Aug. 17, 2017.
Extended European Search Report for Application No. 13796 809.5-1303, dated Dec. 16, 2015.
Extended European Search Report for Application No. 16797376.7, dated Dec. 7, 2018.
Extended European Search Report for European Application No. 16738034.4, dated Sep. 28, 2018 (12 pgs).
International Search Report and Written Opinion for Application No. PCT/US2013/043342, dated Aug. 27, 2013.
International Search Report and Written Opinion for Application No. PCT/US2016/056067, dated Dec. 23, 2016.
International Search Report and Written Opinion for International Application No. PCT/US2017/019420 dated Jun. 2, 2017.
International Search Report and Written Opinion for International Application No. PCT/US2017/057381 dated Jan. 17, 2018.
International Search Report and Written Opinion for PCT Application No. PCT/US2016/033516 dated Aug. 17, 2016.
International Search Report and Written Opinion for International Application No. PCT/US2016/013797 dated Jul. 1, 2016.
Liu et al., "Synergistic Flame Retardant Effects Between Hollow Glass Micospheres and Magnesium Hydroxide in Ethylene-Vinyl Acetate Composites", Polymer Degradation and Stability. vol. 14, Apr. 1, 2014. pp. 87-94.
Naranjo C. et al., "Thermal Properties" in Plastics Testing and Characterization, Industrial Applications, Nov. 1, 2012, Hanser Fachbuchverlag, Munchen, XP 055508349, ISBN: 978-3-446-41315-3, Title page, pp. 88-94, and Abstract.
Partial supplementary European search report for Application No. 16797376.7, dated Sep. 5, 2018.

* cited by examiner

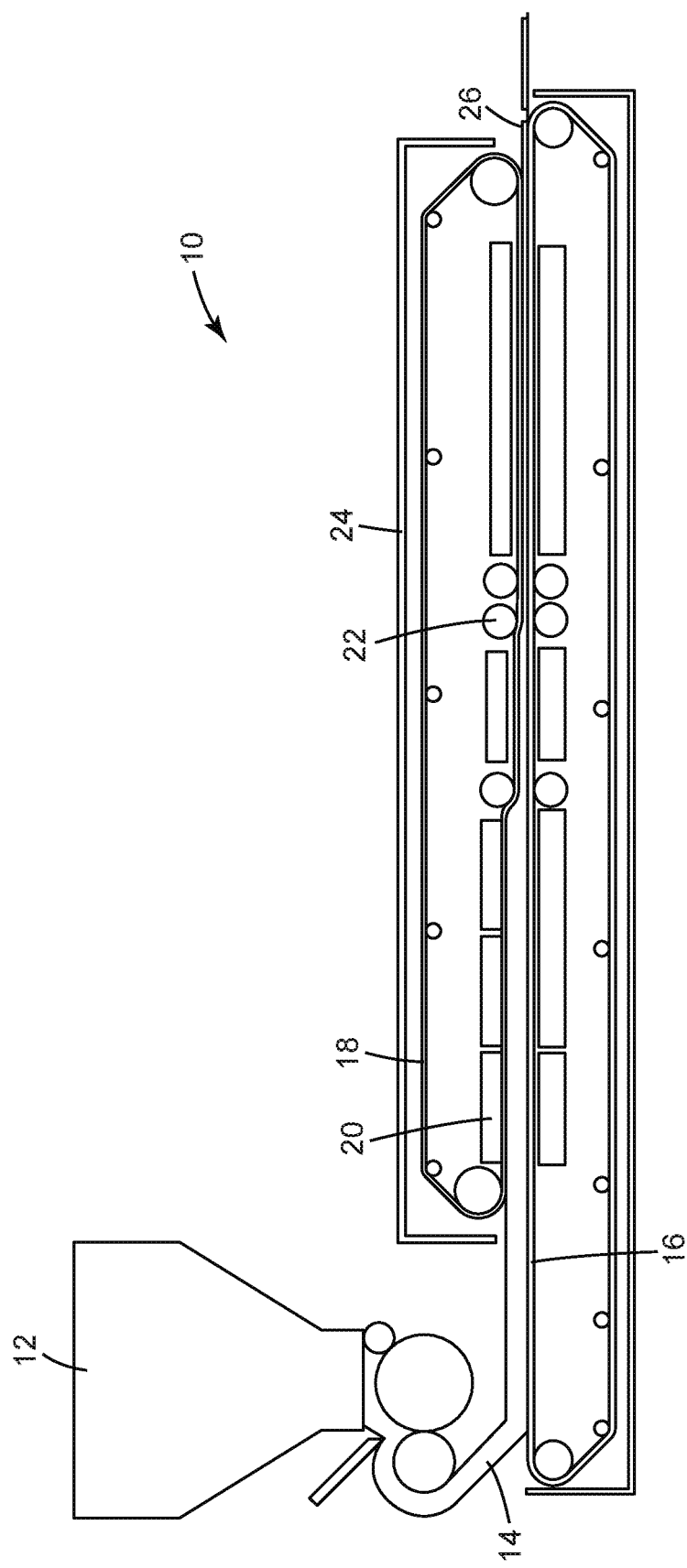

METHOD FOR PRODUCING COMPOSITE SUBSTRATES

CROSS-REFERENCE TO RELATED APPLICATIONS

The present application is a National Phase entry of PCT Application No. PCT/US2016/056067 filed Oct. 7, 2016, which claims priority to U.S. Provisional Application No. 62/238,221 filed Oct. 7, 2015, the disclosures of both of which are hereby incorporated by reference in their entirety.

TECHNICAL FIELD

This disclosure is directed a method of producing a substrate by thermal compression bonding a dispersion and a filler. The resulting substrates possess a high volume of filler that is suitable for a wide range of applications, including those in the construction, automotive vehicle and recreational vehicle markets.

BACKGROUND

Suppliers and original equipment manufacturers in the construction market, automotive market and recreational vehicle market are continuously seeking materials that have an improved strength to weight ratios. Lightweight fillers are often one form of additive used in melt processable polymers to enhance strength to weight ratios. Lightweight fillers may be combined with melt processable thermoplastic compositions in polymer melt processing practices such as extrusion or injection molding. The amount of lightweight fillers employed is often limited due to constraints inherent in the melt processing practices. For example, loading levels of lightweight fillers may be limited in extrusion melt processing due to delivery options in closed systems, density differences between materials and mixing limitations in melt conveying equipment.

SUMMARY

With thermal compression bonding practices, such as a double belt press, high loading levels of fillers, including lightweight fillers, in dry form commingled with a thermoplastic binder can create consolidation problems in the intended substrate. The filler and thermoplastic polymer can be co-scattered onto a lower belt of a double belt press or in certain circumstance agglomerated into a single pellet for scattering onto a lower belt. Consolidation is the term used in thermal compression bonding to describe the consistent distribution of materials and the formation of a solid substrate with physical integrity. Inadequate consolidation may result in a substrate that exhibits the uneven distribution of components and less than desired physical integrity. This can be particularly true with the thermal compression bonding of highly filled materials, including those with greater amounts of filler.

Certain embodiments of this disclosure are directed at a method of forming a composite substrate in a thermal compression bonding process that permit substantially greater amounts of fillers than previously accomplished. The method employs a dispersion and a filler. Light weight fillers are one non-limiting example of fillers that are ideally suited in practicing the embodiments of this disclosure. The dispersion is then used directly in the thermal compression bonding process. For example, a dispersion may be distributed onto a lower belt of a double belt press. The methods of this disclosure enable the formation of a unique and desirable polymer composite in thermal compression bonding systems.

In certain embodiments, the creation of a dispersion with a thermoplastic binder and the filler enables an amount of filler, on a volumetric basis, that far exceed those on dry agglomeration or scattering practices. The dispersion enables uniform coverage of the filler at very high volumetric loading levels. For example, fillers may be utilized in amounts of about 20% by volume or more, preferably 50% by volume or more, and even more preferably 80% by volume or more. Additionally, with lightweight fillers, the use of a dispersion not only permits greater loading levels of fillers, but also results in very desirable physical characteristics in the resulting substrate, such as a low specific gravity. With lightweight fillers and a thermoplastic binder, thermal compression bonded substrates can achieve specific gravity levels of 0.5 $g/cm^3$ or less, 0.45 $g/cm^3$ or less, 0.4 $g/cm^3$ or less, or even 0.3 $g/cm^3$ or less.

The resulting substrates in some embodiments may be employed to create multilayered articles. Aesthetic layers may be bonded to a surface of the substrate to create articles suited for various applications. Additionally, the substrates may be utilized as base panels for receiving and holding other functional layers. Functional layers may include materials that provide desirable characteristics such as adhesion, dampening (sound, etc.), friction, and antistatic properties, among others.

The resulting substrates and multilayered articles produced therefrom exhibit excellent physical characteristics and a desirable degree of consolidation for highly loaded materials.

The following terms used in this application are defined as follows:

"Cellulosic Material or Filler" means natural or man-made materials derived from cellulose. Cellulosic materials include, for example: wood flour, wood fibers, sawdust, wood shavings, newsprint, paper, flax, hemp, grain hulls, kenaf, jute, sisal, nut shells or combinations thereof.

"Composite" means a mixture of a polymeric material and another compound or filler.

"Consolidation" in thermal compression bonding, means the consistent distribution of components and the formation of a solid substrate with physical integrity.

"High Aspect Ratio Filler" means an organic or inorganic material having an aspect ratio of at least 2:1, and in some embodiments at least 4:1, that does not possess viscoelastic characteristics under the conditions utilized to melt process a filled polymeric matrix.

"Dispersion" means at least a polymeric material, and other optional materials dispersed in a solvent, for example in water.

"Filler" means an organic or inorganic material that does not possess viscoelastic characteristics under the conditions utilized to melt process a filled polymeric matrix.

"Lightweight Filler" means an organic or inorganic material with a specific gravity of less than 0.7 $g/cm^3$ and does not possess viscoelastic characteristics under the conditions utilized to melt process a filled polymeric matrix.

"Melt Processable Composition" means a formulation that is melt processed, typically at elevated temperatures, by means of a conventional polymer processing technique such as, for example, extrusion or injection molding.

"Naturally Occurring Inorganic Material" means an inorganic material that is found in nature, for example, volcanic ash and calcium carbonate.

"Panels" means a substrate having a selected width, length and thickness.

"Polymeric Matrix" means a melt processable polymeric material or resin.

"Thermoplastic Binder" means a polymeric material that is capable of interfacial bonding other materials, fillers or components to form a composite.

"Viscoelastic Characteristic" means characteristics of materials that exhibit both viscous and elastic properties when subjected to deformation.

The above summary is not intended to describe each disclosed embodiment or every implementation. The detailed description that follows more particularly exemplifies illustrative embodiments.

DESCRIPTION OF THE DRAWINGS

The FIGURE is a schematic of a thermal compression process suitable for practicing various embodiments of the disclosure.

DETAILED DESCRIPTION

This disclosure is directed at a polymeric composite that is derived from polymeric materials, such as a thermoplastic binder. Various fillers, including lightweight fillers can be combined with polymeric material to tailor the properties of the polymeric composite. For example, the use of lightweight fillers may result in a substrate with desirably low specific gravity. The components are provided as a dispersion to effectively mix the components together. The dispersion enables a high loading level of the filler or fillers beyond that normally obtained with dry mixing or agglomeration practices. The dispersion can be thermally compressed into substrates, which can be converted into articles that require sufficient mechanical strength and desired physical characteristics. In certain embodiments, the substrate may be utilized as one layer in a multilayered article.

A wide variety of polymers conventionally recognized in the art as suitable for melt processing are useful as the thermoplastic binder with the filler to create a substrate. They include both hydrocarbon and non-hydrocarbon polymers. Non-limiting examples of thermoplastic binders include: polyolefins, functional polyolefins, polyacrylates, polymethacrylates, polystryrenics, polyacrylonitrile, acrylonitrile butadiene styrene, polyurethanes, polybutadienes, polyisoprenes, thermoplastic elastomers, thermoplastic olefins, polyamides, polyimides, polyethers, polyesters, polycarbonates, polyureas, polyvinyl resins, polyketones, polyalkylene oxides, copolymers thereof and mixtures thereof. Such materials are well suited for thermal compression bonding applications. In some embodiments, preferred thermoplastic binders may include polyolefins and acrylonitrile butadiene styrene polymers.

The thermoplastic binder may be supplied as a dispersion using conventional solvents. In certain embodiments, the dispersions are typically water based to enable the efficient and environmentally safe removal of the solvent content during thermal compression bonding. Non-limiting examples of solvents useful in the dispersion include: water, alcohols, natural and synthetic oils, non-ionic liquids, polymeric solvents, and organic solvents. In certain embodiments, water may be a preferred solvent. A non-limiting example of a dispersion includes Nychem 156X170, acrylonitrile-butadiene-styrene dispersion, 33-35 wt % solids, commercially available from Emerald Performance Materials (Cuyahoga Falls, Ohio).

The dispersion may be produced by direct suspension, emulsion or dispersion polymerization methods wherein a monomer is polymerized in a solvent that is incompatible with the resulting polymer. Alternatively, the dispersion can be produced by dispersing microparticles of a polymeric material in a solvent. In any of these methods, a surfactant may be employed to enable a stable dispersion.

The thermoplastic binder may be combined with various fillers added to the dispersion. Embodiments with an inorganic filler, an organic filler or combinations thereof are all contemplated by this disclosure. The fillers may be combined with the thermoplastic binder to form a desired dispersion for application with a thermal compression bonding process. Additionally, in certain embodiments, a lightweight filler is employed to obtain a composite substrate possessing particularly desirable physical characteristics, including a low specific gravity.

Inorganic fillers may include such materials as calcium carbonate or talc. Additionally, any naturally occurring inorganic material may be suitable for the formation of the composite. Some embodiments incorporate volcanic ash, mica, fly ash, andesiteic rock, feldspars, aluminosilicate clays, obsidian, diatomaceous earth, silica, silica fume, bauxite, geopolymers pumice, perlite, pumicsite and combinations thereof. The various forms of volcanic ash are well suited for many end use applications. In one embodiment, the inorganic material is chosen such that it has an aspect ratio of at least 1.5:1 (length:width), at least 3:1, or at least 5:1.

Organic materials may also be used as fillers in the composite materials. Various types of organic compounds conventionally recognized by those of ordinary skill in the art may be combined with the reclaimed polymeric material and optional fillers. In some embodiments, cellulosic materials may be utilized in melt processable compositions as fillers to impart specific physical characteristics or to reduce cost of the finished composition. Cellulosic materials generally include natural or wood based materials having various aspect ratios, chemical compositions, densities, and physical characteristics. Non-limiting examples of cellulosic materials include wood flour, wood fibers, sawdust, wood shavings, newsprint, paper, flax, hemp, rice hulls, grain hulls, kenaf, jute, sisal, nut shells, or combinations thereof. Combinations of cellulosic materials and a modified polymer matrix may also be used in the melt processable composition.

In certain embodiments, a lightweight filler may be employed to address the specific gravity and potentially the strength characteristics of the desired end use composite. The lightweight fillers are organic or inorganic material with a specific gravity of less than 0.7 g/cm3. In some embodiments, the specific gravity is less than 0.5 g/cm3, and in others less than 0.3 g/cm3. Non-limiting examples of lightweight fillers include expanded volcanic ash, perlite, pumice, cenospheres, glass microspheres, ceramic microspheres, polymeric microspheres, foamed polymer beads, cellulosic fibers or combinations thereof. Expanded volcanic ash or cellulosic fibers may be particularly desirable for certain embodiments.

In an alternate embodiment, a high aspect ratio filler may be suitable. High aspect ratio fillers are organic or inorganic materials having an aspect ratio of at least 2:1 (length:width), and in some embodiments at least 4:1. Non-limiting examples of high aspect ratio fillers include: volcanic ash, talc, mica, glass, montmorillonite clay, wollastonite, basalt, cellulosic fiber, glass fiber, aluminum fiber, steel fiber, carbon fiber and carbon nanotubes.

In certain embodiments, the dispersion loaded with a filler or fillers may contain on a volumetric basis from 20% by volume of filler and 80% or less by volume of thermoplastic binder. In other embodiments, the dispersion may contain: 50% by volume of a filler and 50% or less by volume of thermoplastic binder, 80% by volume of a filler and 20% or less by volume of thermoplastic binder, 85% by volume of a filler and 15% or less by volume of thermoplastic binder, or even 90% by volume of a filler and 10% or less by volume of a thermoplastic binder. Lightweight fillers are well suited for use with a thermoplastic binder.

Fillers may be mixed with a polymeric dispersion by conventional mixing practices. For example, the filler may be combined with the dispersion containing a thermoplastic binder and tumbled in a rotary mixer. Those of ordinary skill in the art with knowledge of this disclosure will recognize other suitable mixing mechanisms and devices for preparing the filler loaded dispersion.

In another aspect, the dispersion may include coupling agents to improve the compatibility and interfacial adhesion between the reclaimed polymeric composite and any inorganic materials or other fillers. Non-limiting examples of coupling agents include functionalized polymers, organosilanes, organotitanates and organozirconates. Preferred functionalized polymers included functionalized polyolefins, included maleated polyolefins, polyethylene-co-vinyl acetate, polyethylene-co-acrylic acid, and polyethylene-co-acrylic acid salts.

In yet another embodiment, the dispersion may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, adhesion promoting agents and pigments. The additives may be incorporated into the dispersion during mixing with the filler or may be subsequently added to the dispersion upon application with the thermal compression process. The amount and type of conventional additives in the composition may vary depending upon the scope of mixing, extrudable compounds and the desired physical properties of the finished composition. Those skilled in the art of mixing and melt processing are capable of selecting appropriate amounts and types of additives to match with a specific polymeric matrix in order to achieve desired physical properties of the finished material.

A continuous double belt press may be used as a thermal compression manufacturing process. Unlike conventional polymer thermal processing methods such as extrusion and injection molding, the continuous double belt press process does not require precise melt state properties to create the resultant panel or sheet. Because the continuous double belt press does not require the compounded polymer to fill a die or mold to create its shape, it is uniquely suited to handle inhomogeneous materials, such as the polymeric composite of this disclosure derived from the reclaimed polymeric material. The continuous double belt press is capable of achieving this result because it only requires the material to melt slightly during its process and effectively bonds the thermoplastic binder and filler together while minimizing voids under heat and pressure to form a substrate. This process enables the material to be effectively melt processed into a board composition in widths up to 3 meters, thicknesses ranging from 2 mm to 12 mm, and effectively infinite lengths.

In one particular embodiment, a method is initiated by placing the dispersion of this disclosure onto a first rotating belt. The polymeric composite may be derived from (i) a reclaimed polymeric material or polymer, and (ii) a lightweight filler. Thermal compression bonding the pellets then takes place between the first rotating belt with a second rotating belt to form a substrate.

A schematic of a continuous double belt process 10 is depicted in the FIGURE. A dispersion distribution device 12 is employed to spread the desired dispersion 14 onto an extended lower belt 16. An upper belt 18 comes into contact with the dispersion 14 on the lower belt 16 near a heating zone 20. The heat melts or partially melts the thermoplastic binder in the dispersion 14, drives off at least a portion of the water and bonds the components together (not shown). Nip rolls 22 apply compressive forces to assist in the processing of the dispersion 14 into a substrate 26 of indefinite length and may help orient fillers to impart useful properties. An annealing zone 24 is used to finalize the process before the panel exits from belts 16 and 18. Such an apparatus is available from the Sandvik TPS Division of Sandvik Materials Technology Deutschland GmbH of Goppingen, Germany. Upon take off of the substrate 26 of indefinite length from the continuous double belt press, the substrates are divided into smaller sections or panels for end use applications.

The resulting panel or sheets of the thermally compressed polymeric composite may be employed for a variety of end use applications in part due to their physical and chemical characteristics. The polymeric composite may be one durable, moisture resistant, bondable, and possesses a low thermal expansion coefficient. In some embodiments, the polymeric composite may exhibit at least two of flexural modulus of greater than 700 MPa, a notched impact strength of at least 300 J/m, a tensile elongation of at least 4%, and a coefficient of thermal expansion of less than 70 μm/m/K. The polymeric composite exhibits a resistance to moisture as demonstrated by a water uptake of less than 10 wt % after immersion in water for twenty four hours. With some fillers, such as lightweight fillers, the substrate exhibits a specific gravity of 0.5 g/cm$^3$ or less, 0.45 g/cm$^3$ or less, 0.4 g/cm$^3$ or less, or 0.3 g/cm$^3$ or less.

In an alternative embodiment, a continuous filament mat ("CFM") or glass mesh may be utilized as a base material to accept the dispersion of this disclosure. In this embodiment, the dispersion is generally scattered on top of the CFM or glass mesh. Additionally, the CFM or glass mesh may be utilized to enhance the coefficient of thermal expansion, the impact resistance or both. The CFM or glass mesh, during thermal compression bonding becomes an integral part of the glass resulting substrate. A CFM is a reinforcing mat composed of continuous fiber strands that are spun to produce a random fiber orientation and bulk. The CFM uses continuous long fibers rather than short chopped fibers. Continuous filament mat is produced by dispensing molten glass strands directly onto a moving belt in a looping fashion. As the glass fiber cools and hardens and a binder is applied to hold the filaments in place. Such CFM's are commercially available from Huntingdon Fiberglass Products, LLC, Huntingdon, Pa. Examples of such glasses meshes include products available from or a Dryvit Systems, Inc., West Warwick, R.I. Those of ordinary skill in the art are capable of selecting a particular glass mat or CFM to meet desired finished product characteristics In certain embodiments, sheet articles produced using a thermal compression process may be highly isotropic. When sheet articles are produced using conventional melt processing techniques (e.g., sheet extrusion, injection molding), the resultant articles are highly anisotropic and typically have marked differences in mechanical properties in the direction of material flow (machine direction, or MD) versus the transverse direction of material flow (transverse machine direction, or TD). It is not uncommon for mechanical properties (e.g., flexural, tensile, impact, CTE) to differ by more than 50% in the MD versus TD of a sheet article. This artifact may be attributed is a result of residual stress in the material and alignment of polymer chains and fillers in the machine direction. Surprisingly, sheet articles made using a thermal compression process can be highly isotropic. In some cases, the mechanical properties for the MD vs. TD in an article produced using a thermal compression process are within 30% of each other. In another embodiment, they are within 20%, and yet in some further embodiments they are within 10%.

The resulting substrates generated from the thermal compression of the polymeric composite can be used for various applications. Non-limiting examples include a flooring substrate, a roofing panel, a marine panel, a concrete form, a wall panel, a door panel, an automotive panel, an aerospace panel, a recreational vehicle panel or a signage panel. Those of ordinary skill in the art will recognize that the unique properties enable many applications. Additionally, the article constructed from the panels may include indicia applied to a surface of the panel.

The panels may be used to create multilayered articles. The panels used to create the multilayer articles may be on the interior or the exterior of the multilayer construction. For example, the panel may serve as one or more layers of a multilayered article. Those of ordinary skill in the art recognize that various distinct or different layers may be attached or bonded to the resulting panels depending upon the intended end use.

In an alternative embodiment, the panels may be treated to enable bonding or attachment of additional layers to create the multilayered article. Non-limiting examples of such methods known in the art include plasma treatment, corona treatment, silane treatment, use of primer materials or heat treatment.

EXAMPLES

TABLE 1

| MATERIALS | |
| --- | --- |
| Material | Vendor |
| ABS Dispersion | Acrylonitrile butadiene styrene dispersion, 33-35 wt % solids in water. |
| PE Dispersion | Polyethylene dispersion, 44 wt % solids in water. |
| Lightweight Filler | Sil-Cell 32 microcellular lightweight filler, commercially available from Silbrico Corporation (Hodgkins, IL) |

Examples 1-2

In examples 1-2, microspheres were combined with the polymeric dispersion and tumbled in a cement mixer for 15 minutes. The resulting mixture was hand scattered onto a continuous double belt press commercially available from the Sandvik TPS Division of Sandvik Materials Technology Deutschland GmbH of Goppingen, Germany and continuously compression molded into a substrate approximately 3.0 mm in thickness using the following conditions: Belt speed=3.0 m/min, temperature in all heating zones=240° C., Temperatures in cooling zones 1 and 2=40° C. and 20° C. respectively, pressures for nips 1, 2 and 3=0.1 bar, 1 bar and 3 bar, respectively. The resulting samples was machined into 12 cm×12 cm specimens and characterized for specific gravity as determined. The specific formulations and their resulting specific gravities are given in Tables 1 and 2.

TABLE 1

| Formulations for EXAMPLES 1-2 | | | |
| --- | --- | --- | --- |
| EXAMPLE | Lightweight Filler | ABS Dispersion | PE Dispersion |
| 1 | 50 | 50 | |
| 2 | 40 | 60 | |
| 3 | 30 | 70 | |
| 4 | 40 | | 60 |

TABLE 2

| Formulations and Specific Gravity for EXAMPLES 1-2 | |
| --- | --- |
| EXAMPLE | Specific Gravity (g/cm$^3$) |
| 1 | 0.34 |
| 2 | 0.39 |
| 3 | 0.44 |
| 4 | 0.45 |

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A method of forming a substrate comprising:
scattering onto a first rotating belt a dispersion including a liquid solvent, a thermoplastic binder, and a lightweight filler, and
thermal compression bonding the dispersion and lightweight filler between the first rotating belt and a second rotating belt to form a substrate.

2. The method according to claim 1, wherein the liquid solvent is water based.

3. The method according to claim 1, wherein the lightweight filler comprises expanded volcanic ash, perlite, pumice, cenospheres, glass microspheres, ceramic microspheres, polymeric microspheres, foamed polymer beads, cellulosic fibers or combinations thereof.

4. The method according to claim 1, wherein the lightweight filler comprises greater than 20% by volume of the dispersion.

5. The method according to claim 1, wherein the thermoplastic binder comprises a polyolefin, polyacrylate, polymethacrylate, polystryrenic, polyacrylonitrile, acrylonitrile butadiene styrene, polyurethane, polybutadiene, polyisoprene, thermoplastic elastomer, thermoplastic olefin, polyamide, polyimide, polyether, polyester, polycarbonate, polyurea, polyvinyl resin, polyketone, polyalkylene oxide, copolymers thereof and mixtures thereof.

6. The method according to claim 1, wherein the substrate exhibits a specific gravity of 0.5 g/cm³ or less.

7. The method according to claim 1, further comprising at least partially drying the dispersion prior to scattering.

8. The method according to claim 1, further comprising scattering the dispersion onto a continuous filament mat or glass mesh placed onto the first rotating belt.

9. A composition comprising:
a dispersion including a liquid solvent, a thermoplastic binder, and a lightweight filler, the dispersion having greater than 80% by volume of the lightweight filler and 20% or less by volume of the thermoplastic binder.

10. The composition of claim 9, wherein the dispersion has 90% by volume of the lightweight filler and 10% or less by volume of the thermoplastic binder.

\* \* \* \* \*